United States Patent
Scharnick et al.

(10) Patent No.: US 7,610,107 B2
(45) Date of Patent: Oct. 27, 2009

(54) CONTROL SYSTEM HAVING VERIFICATION MODULE

(75) Inventors: Michael R. Scharnick, Brookfield, WI (US); Stephen A. Zbytowski, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/226,154

(22) Filed: Sep. 14, 2005

(65) Prior Publication Data

US 2007/0061019 A1    Mar. 15, 2007

(51) Int. Cl.
 *G05B 11/01* (2006.01)
(52) U.S. Cl. .............................. 700/22; 700/12; 700/79; 700/177
(58) Field of Classification Search ................. 700/117, 700/95, 12, 22, 79, 245, 177
 See application file for complete search history.

(56) References Cited

U.S. PATENT DOCUMENTS

| | | | |
|---|---|---|---|
| 4,697,979 A * | 10/1987 | Nakashima et al. ......... | 700/247 |
| 6,611,416 B1 | 8/2003 | Cleereman et al. | |
| 6,711,713 B1 * | 3/2004 | Rumpler et al. ............. | 714/820 |
| 6,745,103 B1 * | 6/2004 | McKillop et al. ........... | 700/230 |
| 6,764,059 B2 | 7/2004 | Cleereman et al. | |
| 6,937,450 B1 | 8/2005 | Mayer et al. | |
| 7,212,391 B2 | 5/2007 | Cleereman et al. | |
| 2004/0162635 A1 * | 8/2004 | Murakami ................... | 700/245 |
| 2005/0010332 A1 * | 1/2005 | Abe et al. .................... | 700/245 |
| 2006/0072265 A1 * | 4/2006 | Bucella et al. ................ | 361/90 |

OTHER PUBLICATIONS

Product literature concerning: ElectroGuard TM Safety Isolation System; printed Jun. 17, 2005; www.ab.com/safety/electroguard/2030_operation.html; 2003 Rockwell International Corporation.

* cited by examiner

*Primary Examiner*—Kidest Bahta
*Assistant Examiner*—Nathan Laughlin
(74) *Attorney, Agent, or Firm*—Whyte Hirschboeck Dudek; Alexander R. Kuszewski (57) ABSTRACT

The present invention relates to an intermediate module capable of being implemented in conjunction with a safety isolation system, as well as a control system employing such an intermediate module and related operational method. In one embodiment, the intermediate module includes a first input terminal capable of receiving a first signal from an additional device that is at least one of the safety isolation system and another device, and a first output terminal capable of providing a second signal to a controlled device. The intermediate module additionally includes at least one safety relay circuit that receives at least one of the first signal and a first intermediate signal based upon the first signal, and that generates in response at least one of the second signal and a second intermediate signal upon which the second signal is based. The safety relay circuit includes at least one redundant circuit component.

23 Claims, 3 Drawing Sheets

CONTROL SYSTEM HAVING VERIFICATION MODULE

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to control systems such as, for example, industrial control systems for disconnecting, grounding and/or isolating industrial loads with respect to various sources of power.

BACKGROUND OF THE INVENTION

In a variety of environments, including for example industrial environments, there is a need for control systems that are capable of governing the operation of one or more pieces of equipment or machinery in a manner that is highly reliable. Such control systems often employ a high degree of redundancy in their various circuits and other components, so as to guarantee or nearly guarantee that the control systems will achieve intended goals in operating the controlled equipment/machinery and, in the event of failures, that the control systems will operate in such manners that the control systems and the controlled equipment/machinery enter predicted failure states.

Among these control systems are control systems that are designed to disconnect, ground and otherwise isolate controlled equipment/machinery from one or more power sources in a predictable, reliable manner. Such control systems reduce the chance that the controlled equipment/machinery might be unintentionally restarted at times when it is being accessed by repair personnel or technicians for purposes of repair or modification, and thereby enhance the confidence and rapidity with which such personnel can accomplish such repairs/modifications. The power sources from which the controlled equipment/machinery are isolated by these control systems can include any of a number of power sources including, for example, electrical, pneumatic and hydraulic power sources.

Figure 1:
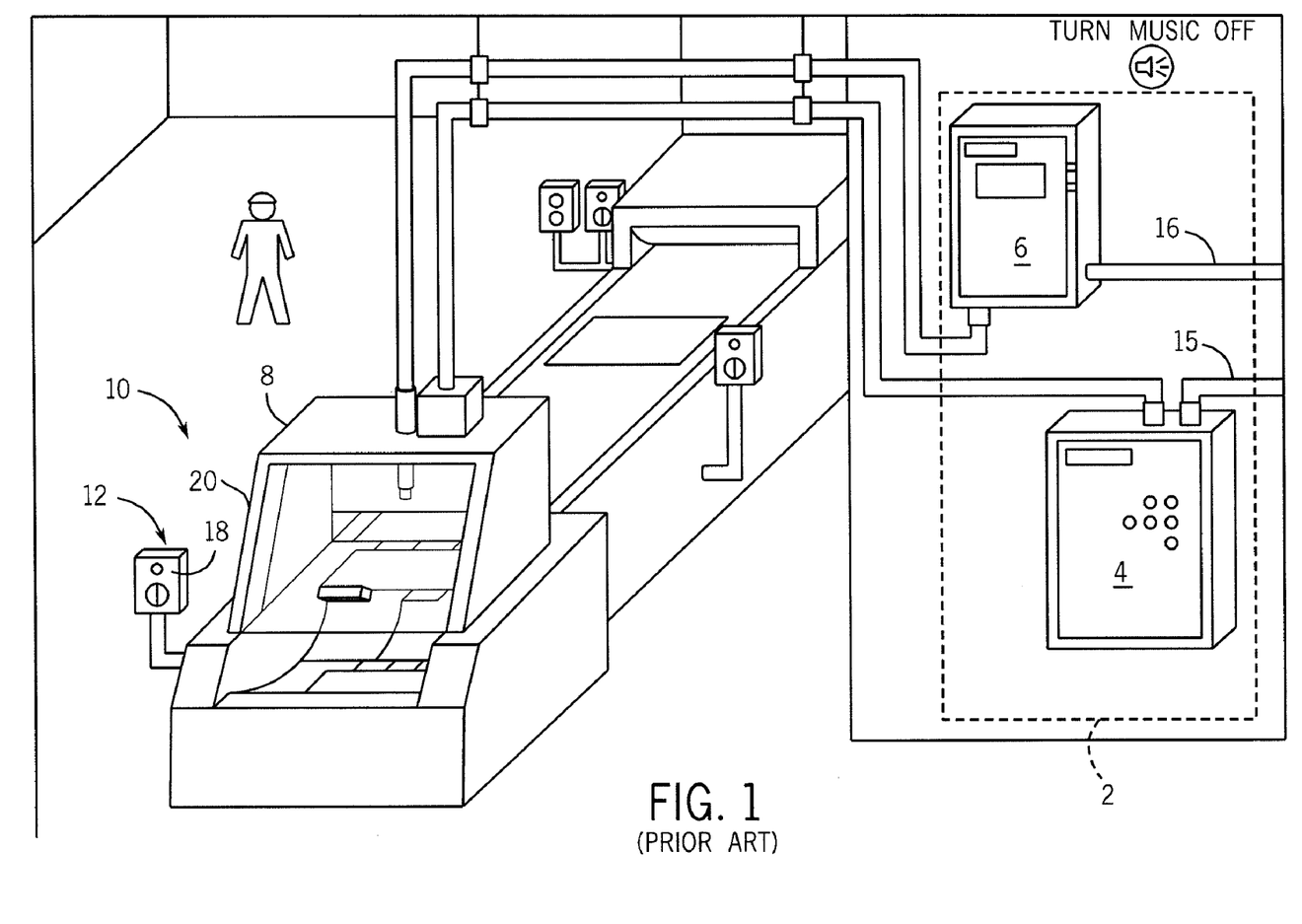
FIG. 1 is a perspective view of an exemplary Prior Art industrial system employing a control system that is capable of disconnecting and isolating loads from two different sources of power.

Referring to FIG. 1, one Prior Art control system of this type is the ElectroGuard™ Bulletin 2030 Safety Isolation System available from Rockwell Automation, Inc. of Milwaukee, Wis., the beneficial assignee of the present application. This control system, shown in FIG. 1 as a control system 2, includes both an electric power isolation system 4 and a pneumatic (or hydraulic) power isolation system 6, and operates as follows.

When a failure or other condition occurs at a machine 8 of an industrial system 10 (in this case, an assembly line), and an operator appropriately switches or triggers a remote lockout switch (RLS) 12 associated with that machine to an "OFF" position, the control system 2 serves to disconnect both electric power and pneumatic power lines 15 and 16, respectively, from the machine so as to decouple the machine from both of those types of power. Additionally, the control system 2 then further serves to ground the machine 8.

Once the machine 8 has been isolated in this manner, an indication is provided to the operator (e.g., a light 18 turns on) indicating that it is appropriate for the operator to access the machine for purposes of making a repair or some other modification to the machine. Typically the operator will then access the machine by entering into a normally-inaccessible region, e.g., by opening a gate 20 and entering into the machine as shown (alternatively, for example, the operator could pass through a light curtain).

Once the operator has completed the repair/modification and left the normally-inaccessible region, the operator appropriately switches or triggers the RLS 12 again, this time to an "ON" position. After this occurs, the control system 2 reestablishes the connections between the power sources and the machine 8. The control system 2 typically employs redundant circuitry such as safety relays to enhance the control system's reliability in performing its control functions in this regard.

Although control systems such as the control system 2 shown in FIG. 1 are useful, such control systems are typically designed to have only limited purpose(s) and functionality. For example, the control system 2 merely serves the purposes of disconnecting/connecting one or more machines such as the machine 8 from electric and pneumatic power sources, grounding the machine(s), and conducting related communications with RLSs such as the RLS 12. In certain applications, however, it would be advantageous if such control systems could be reconfigured in a manner allowing for expanded functionality, particularly functionality involving control or monitoring of additional equipment/machines.

Despite the desirability of providing such additional functions in some circumstances, it is not possible to reconfigure conventional control systems such as the control system 2 to achieve such additional functions in the field. Largely this is because such conventional control systems are carefully designed to include sufficient redundancy to enhance reliability and behave in predictable manners during failures. Reconfiguration of such conventional control systems in the field could unpredictably alter the control systems' behavior and undermine the control systems' reliability, and consequently conventional control systems typically are designed in a manner that prevents such ad hoc reconfigurations.

Given that it would be desirable for reliable, failure-resistant control systems such as the control system 2 to have additional control and/or monitoring capabilities, and given that conventional systems of this type are not readily reconfigurable to provide such capabilities, it would be advantageous if an improved control system of this general type was developed that was capable of providing such capabilities. Further, it would also be advantageous if such an improved control system achieved similar levels of redundancy, reliability and failure-resistance as conventional control systems of this type.

BRIEF SUMMARY OF THE INVENTION

The present inventors have recognized the desirability of reliable, failure-resistant control systems with expanded capabilities. The present inventors further have recognized that, in some embodiments, such an improved control system could be achieved by adding one or more additional modules to a conventional primary control system, where each additional module was capable of outputting one or more control signals to one or more external devices when one or more particular system status events occurred, and/or capable of monitoring input signals received from the external device(s), and/or capable of providing feedback signals to the primary control system based upon information from the external device(s) or other information.

More particularly, in at least some embodiments, the present invention relates to a control system. The control system includes a first control module that receives an input signal and, in response to the input signal, causes at least one power source to be disconnected from a first device. The control system further includes a second control module coupled to the first control module. The second control module receives at least one of the input signal and a secondary signal based upon the input signal, and the second control module further outputs a control signal in response to the at least one input and secondary signal. Additionally, the control signal is configured to be received by at least one of the first device and a second device associated with the first device.

The present invention also in some embodiments relates to an intermediate module capable of being implemented in conjunction with a safety isolation system. The intermediate module includes a first input terminal capable of receiving a first signal from an additional device, where the additional device is at least one of the safety isolation system and another device, and a first output terminal capable of providing a second signal to a controlled device. The intermediate module additionally includes at least one safety relay circuit that receives at least one of the first signal and a first intermediate signal based upon the first signal, and that generates in response at least one of the second signal and a second intermediate signal upon which the second signal is based, where the safety relay circuit includes at least one redundant circuit component.

The present invention further in some embodiments relates to a method of extending a control capability of an industrial control system. The method includes coupling an intermediate module between the industrial control system and a controlled device, and receiving an input signal at the intermediate module from at least one of the industrial control system and another device. The method further includes generating, by way of a plurality of redundant circuit components, an intermediate signal to be provided to the controlled device, and outputting the intermediate signal to the controlled device. The method additionally includes monitoring at least one pair of redundant feedback signals from the controlled device indicative of a status of at least one aspect of the controlled device, and taking at least one additional action based upon the monitored redundant feedback signals.

DETAILED DESCRIPTION OF THE PREFERRED EMBODIMENT

In at least some embodiments, the present invention can be part of a "safety system" used to protect human life and limb in an industrial or other environment. Nevertheless, the term "safety" as used herein is not a representation that the present invention will make an industrial or other process safe or that other systems will produce unsafe operation. Safety in an industrial or other process depends on a wide variety of factors outside of the scope of the present invention including, for example: design of the safety system, installation and maintenance of the components of the safety system, and the cooperation and training of individuals using the safety system. Although the present invention is intended to be highly reliable, all physical systems are susceptible to failure and provision must be made for such failure.

Figure 2:
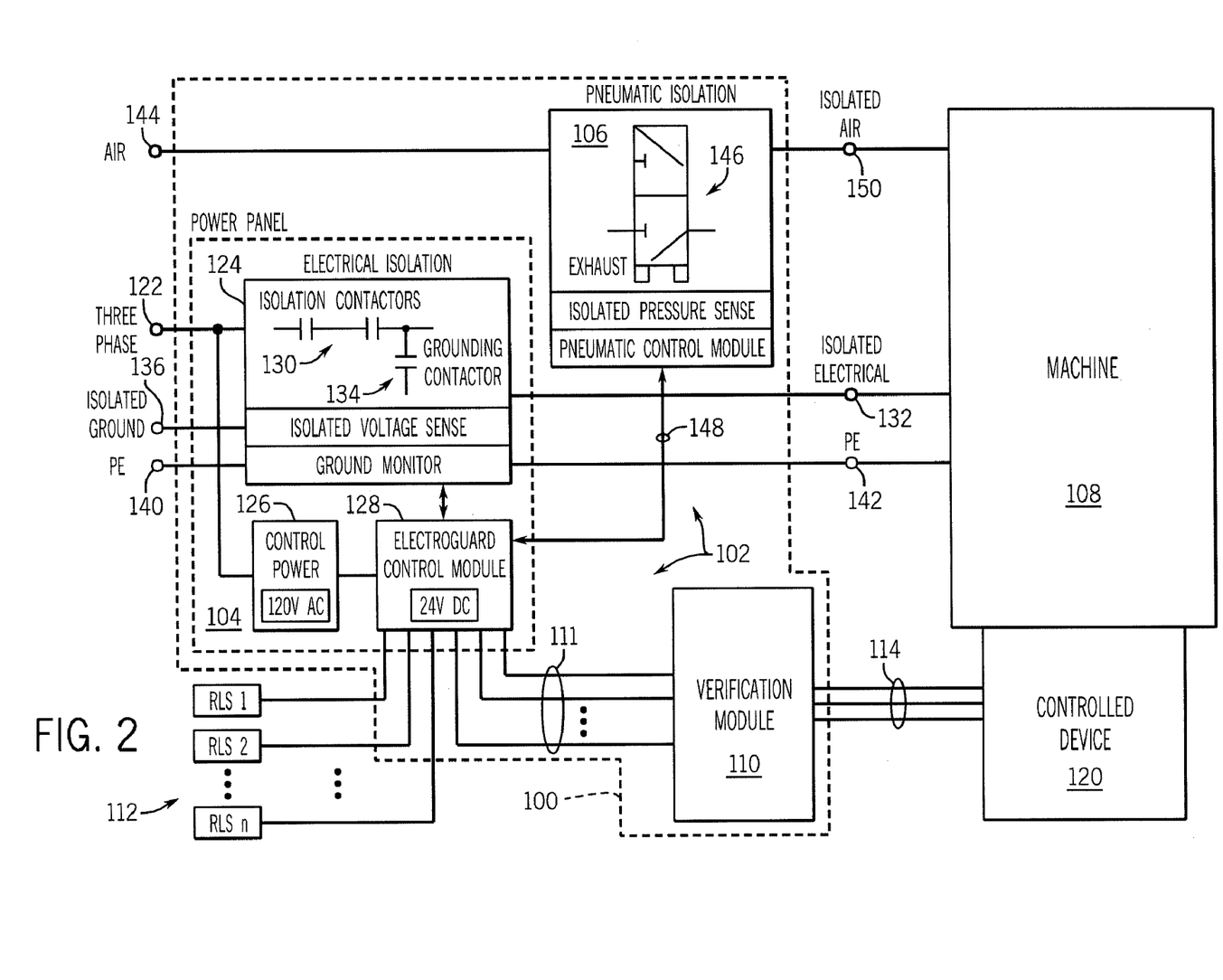
FIG. 2 shows in schematic form an improved version of the control system of FIG. 2 in accordance with one embodiment of the present invention, where the control system includes an additional module capable of interacting with both a primary control module of the control system and with a controlled device.

Referring to FIG. 2, an improved control system 100 in accordance with certain embodiments of the present invention is shown to be coupled to and in communication with multiple remote lockout switches (RLSs) 112 (or other safety device(s) with redundant outputs), a controlled machine 108, and a controlled device 120. As discussed above with respect to FIG. 1, the machine 108 could be implemented as part of an assembly line or other industrial system. However, the machine 108 is also generally intended to be representative of one or more machines or other pieces of equipment of a variety of types for implementation in a variety of industrial or other circumstances, for example, in other large facilities that implement various processes such as in hospitals, airports (e.g., a baggage handling system), etc.

The control system 100 includes a primary control module 102 that, as with the control system 2 discussed with respect to FIG. 1, includes both an electric power isolation system 104 and a pneumatic (or, alternatively, hydraulic) power isolation system 106. The electric power isolation system 104 receives three-phase power from a three-phase power source (not shown) by way of an electrical input port 122. The three-phase power received at the electrical input port 122 is provided both to an electrical isolation module 124 and a control power module 126. The control power module 126 converts the three-phase power into 120 Volt AC power, which it then provides to an internal control module 128.

The internal control module 128 governs the operation of the electrical isolation module 124 based upon one or more signals that it receives from the multiple RLSs 112 (or other safety device(s) with redundant outputs), to which the internal control module is coupled. Typically, when one or more of the RLSs 112 are appropriately switched or triggered to an "OFF" position, the internal control module 128 causes isolation contactors 130 within the electrical isolation module 124 to open so as to disconnect the three-phase power received at the electrical input port 122 from an electrical output port 132.

Subsequently, grounding contactors 134 within the electrical isolation module 124 are further actuated by the internal control module 128 so as to couple the electrical output port 132 to ground. More particularly, in the present embodiment, the electrical output port 132 is coupled to an isolated ground port 136 of the electrical power isolation system 104. Also as shown, the electric power isolation system 104 includes a protective earth (PE) input terminal 140, and a PE output terminal 142. The PE input terminal 140 is coupled to a standard earth ground, and the PE output terminal 142 is coupled both to the PE input terminal 140 and in turn to the machine 108 such that the machine has access to the standard earth ground. Thus, by virtue of the operation of the isolation contactors 130 and the grounding contactors 134, the machine 108 is entirely isolated from the three-phase power source and grounded.

Further as shown in FIG. 2, the pneumatic power isolation system 106 is capable of receiving pressurized air at an air input port 144. One or more valves 146 within the pneumatic power isolation system 106 are controlled by way of signals provided from the internal control module 128, to which the pneumatic power isolation system 106 is coupled by way of one or more communication links 148. Similar to the operation of the electric power isolation system 104, when one or more of the RLSs 112 (or other safety device(s) with redundant outputs) is appropriately switched or triggered to the "OFF" position, the air output port 150 is decoupled and isolated from the air input port 144.

Thus, when one or more of the RLSs 112 is switched or triggered to the "OFF" position, the machine 108, which is coupled to each of the output ports 132 and 150, ceases to receive any electrical or pneumatic power and is isolated from the power sources coupled to the input ports 122 and 144. However, when the RLSs 112 are appropriately switched or triggered in the reverse direction to the "ON" position, the internal control module 128 causes the electrical power isolation system 104 and the pneumatic power isolation system 106 to reestablish the connections between those power sources and the machine 108.

In accordance with certain embodiments of the present invention, the improved control system 100 not only includes the primary control module 102 but also includes an additional, secondary, expansion or "verification" module 110. One exemplary embodiment of the verification 110 is described in more detail with reference to FIG. 3, although it should be understood that the FIG. 3 embodiment is only intended to be representative of a variety of different embodiments and types of verification modules that could be employed in a variety of circumstances. As shown in FIG. 2, the verification module 110 is in communication with the internal control module 128 of the primary control module 102 by way of one or more communication links 111. The signals communicated on the links 111 between the internal control module 128 and the verification module 110 can vary depending upon the embodiment.

For example, in certain embodiments, the internal control module 128 merely relays the signals received from the RLSs 112 to the verification module 110 by way of the links 111. Indeed, in certain alternate embodiments, the RLSs 112 can be directly coupled to the verification module 110 by way of direct communication links (not shown), in addition to being coupled to the internal control module 128. In other embodiments, the signals provided on the communication links 111 can be based upon (e.g., functionally related to) the signals provided from the RLSs 112, or can be generated in other manners. In the present embodiment, the communication links 111 conduct both control (or other informational) signals from the internal control module 128 to the verification module 110 and also conduct feedback (or other informational) signals from the verification module back to the internal control module.

Also as shown, the verification module 110 is additionally in communication with the controlled device 120 by way of one or more further communication links 114. As discussed in further detail with reference to FIG. 3, the signals provided between the verification module 110 and the controlled device 120 in the present embodiment include both control (or other informational) signals provided by the verification module to the controlled device as well as feedback (or other informational) signals provided from the controlled device back to the verification module. However, in alternate embodiments only control signals are provided from the verification module 110 to controlled device 120, or feedback signals are provided from the controlled device to the verification module.

The controlled device 120 shown in FIG. 2 is intended to be representative of any of a variety of different devices that could be controlled by, monitored by, or otherwise in communication with the verification module 110 for a variety of purposes. As discussed in further detail with reference to FIG. 3, in one embodiment the controlled device 120 is a gate such as the gate 20 shown in FIG. 1, where the gate includes both a gate lock that is controlled in response to signals from the verification module 110 as well as one or more gate sensors that sense whether the gate is currently open or closed and provide signals indicative of the gate's status back to the verification module. Although this embodiment in which the controlled device 120 is a gate with a gate lock is one example of a controlled device, the controlled device 120 is also intended to be representative of a variety of other devices.

These could include, for example, light curtains, interlocking switches, solenoid switches, trapped key systems, and other similar mechanisms that are commonly employed in industrial environments. Further, the controlled device 120 is also intended to be representative of other devices in a variety of other environments that could be controlled and/or monitored. Although in the present embodiment the controlled device 120 is termed a "controlled device" insofar as one or more components of the controlled device are at least partly controlled or influenced by signals from the verification module 110, in alternate embodiments the device could instead merely be a "monitored device" that provided signals back to the verification module to allow the verification module and/or the internal control module 128 to monitor the status of the device.

Figure 3:
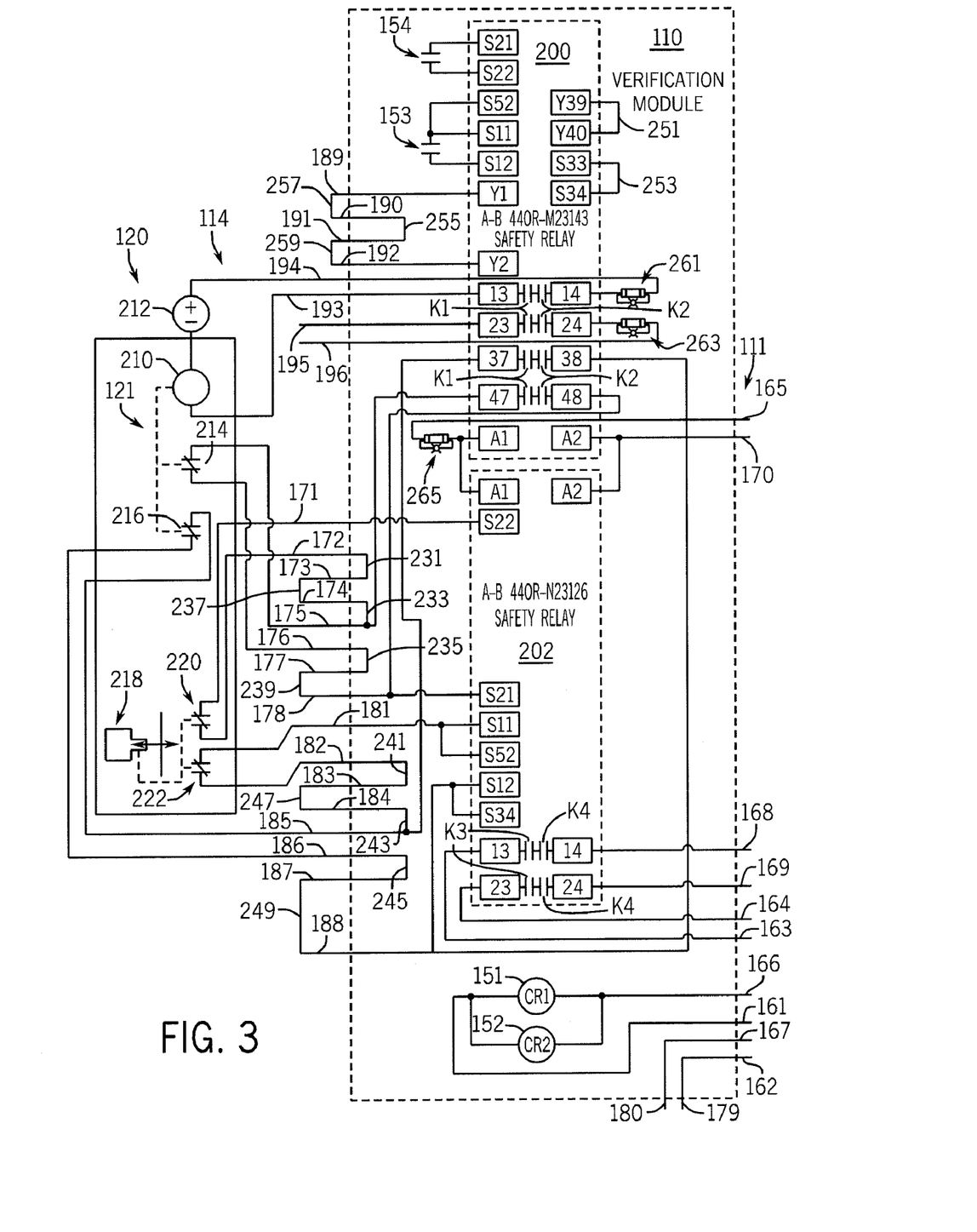
FIG. 3 shows in schematic form, in greater detail, the additional module of FIG. 2 when interconnected with one exemplary type of controlled device.

Turning to FIG. 3, one exemplary embodiment of the combination of the verification module 110 and the controlled device 120 is shown in more detail. In this embodiment, the controlled device 120 to which the verification module 110 is coupled is a gate including an Atlas 5 Guard Locking Switch 120 available from Rockwell Automation, Inc., the beneficial assignee of the present application. The verification module 110 includes first and second safety relay circuits 200 and 202, which in the present embodiment are A-B 440R-M23143 and A-B 440R-N23126 safety relay circuits, respectively, which are also available from Rockwell Automation, the beneficial assignee of the present application.

The verification module 110 also has ten ports 161-170 that are available for both data communications and power delivery between the verification module and the primary control module 102, and can be understood as constituting the communication links 111. In some alternate embodiments, some or all of these communication ports 161-170 are connected directly to one or more of the RLSs 112 (or other ports similar to where the RLSs 112 are plugged in), or receive signals that are identical to or based upon the signals from those devices. As discussed further below, in the present embodiment, ports 161 and 166 constitute the primary control signal input terminals for the verification module 110. The ports 165 and 170 allow for the providing of power to the verification module 110, specifically to ports A1 and A2 on each of the safety relay circuits 200,202. Further, the ports 163, 164, 168, and 169 allow for output or feedback signals to be communicated back to the primary control module 102.

In the present embodiment, the ports 161 and 166 constituting the primary control signal input terminals of the verification module 110 are coupled to redundant first and second solenoid coils 151 and 152, which are coupled together in parallel between the ports 161 and 166. More specifically, a voltage differential is created between the ports 161 and 166 when one of the RLSs 112 is switched to the "OFF" position such that the machine 108 is isolated from the electrical and pneumatic power sources by the primary control module 102. When the voltage differential is created between the ports 161 and 166, each of the redundant coils 151 and 152 is energized. The energizing of the first and second coils 151 and 152, respectively, in turn causes first and second normally-open contacts 153 and 154 associated with the first safety relay circuit 200 to be closed, respectively.

The first normally-open contact 153 is coupled between ports S11 and S12 of the safety relay circuit 200, while the second normally-open contactor 154 is coupled between ports S21 and S22 of the safety relay circuit (the port S11 is also short-circuited to port S52). Consequently, when the first and second normally-open contacts 153 and 154 are short-circuited, ports S11 and S12 become short-circuited to one another as do ports S21 and S22. The short-circuiting of ports S11 and S12 together and short-circuiting of ports S21 and S22 together while connections 189 & 190 are shorted together and 191 & 192 are shorted together in turn causes four additional normally-open contacts K1 and K2 of the safety relay circuit 200 to become closed.

Further as shown, the safety relay circuit 200 includes four pairs of ports 13-14, 23-24, 37-38 and 47-48. One of the normally-open contacts K1 and one of the normally-open contacts K2 are connected in series between each of these respective pairs of ports 13-14, 23-24, 37-38 and 47-48. Consequently, when the two coils 151 and 152 are both energized so as to close each of the contacts 153 and 154, the two ports of each respective pair of ports 13-14, 23-24, 37-38, and 47-48 are short-circuited to one another due to the closing of its respective pair of contacts K1 and K2 (that is, for example, port 13 is short-circuited with respect to port 14). The ports 13, 14, 23 and 24 of the first safety relay circuit 200 constitute (or are directly coupled to) first, second, third and fourth output terminals 193, 194, 195 and 196, respectively, of the verification module 110.

In the present embodiment, the third and fourth output terminals 195 and 196 are left unused, albeit such terminals could in alternate embodiments instead be connected to an additional gate lock (not shown) similar to the gate lock 120. However, the first output terminal 193 is coupled to a gate lock energizing solenoid 210 of the gate/controlled device 120. Additionally, the second output terminal 194 is coupled to a voltage source 212, with the voltage source in turn also being coupled to the solenoid 210. Consequently, when the first safety relay circuit 200 is turned "ON" due to the closing of the normally-open contacts 153 and 154 and the contacts K1 and K2 of the safety relay circuit, power is applied to the solenoid 210. Energizing of the solenoid 210 causes the gate lock 121 to open, which in turn would allow an operator to open the gate and thereby access the machine 108 for the purpose of repairing or otherwise modifying the machine status.

The solenoid 210 within the gate/controlled device 120 is mechanically coupled to a pair of redundant normally-closed contacts 214 and 216 that, as discussed in further detail below, provide feedback signals to the verification module 110. Further as shown, the gate/controlled device 120 not only includes the solenoid 210 and normally-closed contacts 214, 216 but also includes a gate position sensor 218 that is mechanically coupled to two normally-closed contacts 220 and 222. As discussed further below, each of these contacts 220, 222 is coupled to the verification module 110 to provide feedback information thereto indicative of the open/closed status of the gate.

The verification module 110 in addition to providing the ports 161-170 and the output terminals 193-196 further includes a first set of input terminals 171-178 and a second set of input terminals 181-188. As discussed in further detail below, the input terminals 171-178 are used to determine whether ports S21 and S22 of the second safety relay circuit 202 are short-circuited to one another. The second set of input terminals 181-188 are used to determine whether ports S11 and S12 of the second safety relay circuit 202 are short-circuited to one another. As in the case of the first safety relay circuit 200, when both ports S11 and S12 of the second safety relay circuit 202 are short-circuited to one another and ports S22 and S21 of the second safety relay circuit are short-circuited to one another, the second safety relay circuit turns "ON".

In the present embodiment, input terminals 172 and 173 are connected to one another within the verification module 110 by a jumper 231. Likewise, terminals 174 and 175 are coupled to one another by a jumper 233, and terminals 176 and 177 are coupled to one another by a jumper 235. Further, only the input terminals 171, 172, 175 and 176 are coupled to the gate/controlled device 120 and receive signals therefrom, while terminals 173 and 174 are coupled to one another by way of an additional jumper 237 and terminals 177 and 178 are coupled to one another by a jumper 239. The jumpers 237 and 239 are coupled externally to the verification module 110 and, in alternate embodiments, can be taken off so as to allow the terminals 173, 174, 177 and 178 to likewise receive input signals from the controlled device 120 or another controlled device.

Further as shown, in the present embodiment the terminals 171 and 172 are respectively coupled to opposite sides of the normally-closed contact 220 of the gate/controlled device 120, while the terminals 175 and 176 are respectively coupled to opposite terminals of the normally-closed contact 214. Internal to the verification module 110, the terminal 171 is coupled to the port S22 of the second safety relay circuit 202 while the terminal 178 is coupled to the port S21 of the second safety relay circuit. Additionally, the terminal 178 is also coupled to port 48 of the first safety relay circuit 200, while terminal 175 (as well as terminal 174 by way of jumper 233) is coupled to port 47 of the first safety relay circuit.

Consequently, when the normally-open contacts 153 and 154 coupled to the first safety relay circuit 200 are both closed so as to result in the turning "ON" of that safety relay circuit and the closing of the contacts K1, K2 between ports 47 and 48, the terminals 175 and 178 of the verification module 110 are short-circuited to one another. When this is the case, the status of the normally-closed contact 214 has no effect on whether ports S21 and S22 of the second safety relay circuit 202 are coupled to one another. Rather, in such case, the coupling of ports S21 and S22 of the second safety relay circuit 202 is fully determined by the status of the normally-closed contact 220 coupled between the terminals 171 and 172.

The input terminals 181-188 are largely redundant in view of the terminals 171-178. More particularly, the terminals 181 and 182 are respectively coupled to opposite sides of the normally-closed contact 222, which is redundant with respect to the normally-closed contact 220. Similarly, the terminals 185 and 186 are respectively connected to opposite sides of the normally-closed contact 216, which is redundant in view of the contact 214. The terminals 182 and 183 are coupled to one another by way of a jumper 241, terminals 184 and 185 are coupled to one another by a jumper 243, and terminals 186 and 187 are coupled to one another by a jumper 245, with all three jumpers being internal to the verification module 110. Also, the terminals 183 and 184 are short-circuited to one another by a jumper 247 and terminals 187 and 188 are short-circuited to one another by a jumper 249, with both jumpers being externally mounted on the verification module 110.

Further as shown in FIG. 3, in the present embodiment, the terminal 181 internally within the verification module 110 is also coupled to each of ports S11 and S52 of the second safety relay circuit 202. Likewise, the terminal 188 is coupled to each of the ports S12 and S34 of the second safety relay circuit 202. Further, terminal 185 is additionally coupled to the port 37 of the first safety relay circuit 200 and terminal 188 is coupled to the port 38 of the first safety relay circuit. Consequently, when the normally-open contacts 153 and 154 are both closed resulting in the closure of the normally-open contacts K1 and K2 connected between the ports 37 and 38, the terminals 185 and 188 are short-circuited to one another such that the status of the normally-closed contact 216 has no influence upon whether ports S11 and S12 of the second safety relay circuit 202 are connected to one another. In that case, only the status of the normally-closed contact 222 connected between the terminals 181 and 182 has any impact upon the connection between ports S11 and S12 of the safety relay circuit 202.

When the ports S22 and S21 of the second safety relay circuit 202 are short-circuited with one another and additionally the ports S11 and S12 of that safety relay circuit are short-circuited with one another, the safety relay circuit turns "ON" causing two pairs of normally-open contacts K3 and K4 within that safety relay circuit to be closed. As shown, one of the contacts K3 and one of the contacts K4 are connected in series between each of the ports 13 and 14 and ports 23 and 24 of the second safety relay circuit 202. The ports 13 and 14 are respectively coupled to the output terminals 163 and 168 of the verification module 110, respectively, while the ports 23 and 24 are respectively coupled to the output terminals 164 and 169 of the verification module, respectively.

Therefore, when the second safety relay circuit 202 turns "ON" due to the short-circuiting of the ports S21 and S22 with one another and the short-circuiting of the ports S12 and S11 with one another, the ports 13 and 14 are short-circuited to one another and the ports 23 and 24 are short-circuited to one another, resulting in the short-circuiting of the terminals 164 and 169 to one another and the short-circuiting of the terminals 163 and 168 to one another. The terminals 163, 164, 168 and 169 are coupled to the primary control module 102 by some of the communication links 111. The output signal provided by the terminals 164 and 169 is redundant with respect to the output signal provided by the output terminals 163 and 168. So long as both of the pairs of terminals 164 and 169 and 163 and 168 are short-circuited to one another, the primary control module 102 does not isolate the machine 108 from each of the electrical and pneumatic power sources. When one or both of the pairs of terminals 164 and 169 and 163 and 168 are open, the primary control module 102 isolates the machine 108 from each of the electrical and pneumatic power sources.

As is apparent from FIG. 3 and from the above discussion, the verification module 110 as well as the gate/controlled device 120 are designed to have redundancy in most if not all of the circuit components. Among these redundancies are the following: the redundancy of the coils 151 and 152 with one another, the redundancy of the normally-open contacts 153 and 154 with one another, the redundancy of the normally-closed contacts 214 and 216 with one another, the redundancy of the normally-closed contacts 220 and 222 with one another, the redundancy of the terminals 171 and 172 with the terminals 181 and 182, the redundancy of the terminals 175 and 176 with the terminals 185 and 186, the redundancy of the ports 13 and 14 (and the intermediate contacts K1 and K2) of the first safety relay circuit 200 with the ports 23 and 24 (and intermediate contacts K1 and K2) of that safety relay circuit, the redundancy of the ports 13 and 14 (and the intermediate contacts K3 and K4) of the second safety relay circuit 202 with the ports 23 and 24 (and intermediate contacts K3 and K4) of that safety relay circuit, and the redundancy of terminals 163 and 168 with the other terminals 164 and 169.

In addition to providing these redundancies, the present embodiment of the verification module 110 is expandable in terms of some of its capabilities. As discussed above, the output terminals 195 and 196 could be used to control an additional solenoid or other controllable element. Likewise, the terminals 173, 174, 177, 178, 183, 184, 187 and 188 all could be used to receive feedback signals from such additional components in a redundant manner. Further, the first safety relay circuit 200 includes additional input terminals 189, 190, 191 and 192 that, although unused in the present embodiment, could be utilized in alternate embodiments to determine whether a "predecessor condition" was met.

More particularly, the terminals 189 and 192 of the verification module 110 are respectively coupled to ports Y1 and Y2 of the first safety relay circuit 200. In the present embodiment, the terminals 190 and 191 are coupled to one another internally within the verification module 110 by a jumper 255, while the terminals 189 and 190 are coupled to one another by way of an external jumper 257 and terminals 191 and 192 are coupled to one another by an external jumper 259, such that the ports Y1 and Y2 of the safety relay circuit 200 are short-circuited to one another. However, in alternate embodiments, one or more of the jumpers 255, 257 and 259 could be removed such that an outside device such as the controlled device 120 or another controlled device could provide input signal(s) to the safety relay circuit 200 governing whether the ports Y1 and Y2 were short-circuited to one another and thus additionally influencing whether the safety relay circuit 200 would be "ON".

In addition to the above-discussed components, it should be noted that in the present embodiment the verification module 110 further includes several fuses, namely, a first fuse 261 linking the port 14 of the first safety relay circuit 200 with terminal 194, a second fuse 263 connecting the port 24 with the terminal 196, and a third fuse 265 linking the ports A1 of the first and second safety relay circuits 200, 202 with the terminal 165. Further, the verification module 110 also includes two additional ports Y39 and Y40 that are short-circuited to one another by a jumper 251, as well as ports S33 and S34 that are short-circuited to one another by a jumper 253. Additionally, the ports 162 and 167 are directly coupled to output ports 179 and 180 that in the present embodiment are unused but, in some alternate embodiments, can be used to provide signals representing status information to a programmable logic controller (PLC).

Given the above-described structure of the verification module 110 and controlled device 120, the verification module operates in conjunction with the controlled device as well as with the primary control module 102 and the RLSs 112 (shown in FIG. 2) as follows. When an event necessitating operator access to the machine 108 (e.g., a blocking of the machine or other assembly line failure) occurs, the operator switches or otherwise triggers an appropriate one or more of the RLSs 112 to an "OFF" position. As a result, one or more signals are provided to the control module 128 causing the control module in turn to cause the electric and pneumatic power isolation systems 104, 106 to isolate the machine 108 from both electrical and pneumatic power. At the same time, the control module 128 also sends additional signals on one or more of the communication links 111 to the input terminals 161 and 166 of the verification module 110 resulting in a voltage differential being applied across the coils 151 and 152.

Upon application of the voltage differential to the input terminals 161,166, the normally-open contacts 153, 154 become closed. This in turn causes the first safety relay circuit 200 to turn "ON" and more particularly causes the normally-open contacts K1 and K2 of that safety relay circuit to close such that a voltage differential is applied across the solenoid 210 of the controlled device 120. Assuming that the solenoid 210 and the normally-closed contacts 214 and 216 mechanically-coupled to the solenoid are operating properly (e.g., the contacts are not welded closed), the actuation of the solenoid 210 causes the gate lock 121 of the controlled device 120 to open and causes each of the normally-closed contacts 214 and 216 to open as well. As a result, terminals 175 and 176 of the verification module 110 become open-circuited with respect to one another, as do terminals 185 and 186 of the verification module.

Notwithstanding the open-circuiting of the terminals 175, 176 and 185,186, the terminals 175 and 178 are still short-circuited to one another and the terminals 185 and 188 are still short-circuited to one another, due to the short-circuiting of the ports 37 and 38 of the first safety relay circuit 200 with respect to one another and short-circuiting of ports 47 and 48 of the first safety relay circuit with respect to one another when that safety relay circuit is turned "ON". Assuming that the gate through which the operator gains access to the machine 108 initially is closed when the solenoid 210 is actuated, at that time the normally-closed contacts 220 and 222 both are open-circuited such that terminals 171 and 172 are open-circuited with respect to one another and terminals 181 and 182 are open-circuited with respect to one another.

However, at such time as the gate is opened by the operator and appropriate sensing signals are provided to the normally-closed contacts 220 and 222 resulting in opening of those contacts, the terminals 171 and 172 become open-circuited to one another as do the terminals 181 and 182. At that time, when the machine 108 is then accessible to the operator and the gate in particular is open, ports S22 and S21 of the second safety relay circuit 202 are open-circuited with respect to one another as are ports S11 and S112. Thus, the second safety relay circuit 202 turns "OFF" and the ports 13 and 14 of that safety relay circuit are open-circuited with respect to one another, as are the ports 23 and 24 of that safety relay circuit. Consequently, the output terminals 163 and 168 become open-circuited with respect to one another as do the output terminals 164 and 169 with respect to one another.

The open-circuit signals provided at the output terminals 163,164,168 and 169 are then communicated back to the control module 128 by way of the communication links 111. So long as one of these pairs of output terminals are in the open-circuit condition, the control module 128 will maintain the isolation of the machine 108, notwithstanding a reverse switching or triggering of the RLSs 112 that originally precipitated the isolation of the machine 108 and closing the gate. That the verification module 110 maintains the isolation status of the machine 108 notwithstanding such reswitching of the RLS 112 to its "ON" position until such time as the gate is returned to the closed position can be seen as follows.

Assuming that the second safety relay circuit 202 begins in its "OFF" state and that the first safety relay circuit 200 begins in its "ON" state (corresponding to the RLS 112 being in its "OFF" position and to the machine 108 being isolated), if the RLS 112 is then switched to its "ON" position so as to turn off the coils 151 and 152, then the first safety relay circuit 200 switches to its "OFF" state due to the decoupling of the ports S21 and S12 from the ports S22 and S11 of that safety relay circuit. This in turn causes the solenoid 210 to be turned off and additionally causes the open-circuiting of the ports 37 and 38 and the ports 47 and 48 of the first safety relay circuit 200 with respect to one another, due to the delayed open circuiting of the normally-open contacts K1 and K2 within that safety relay circuit.

When the solenoid 210 turns off, the normally-closed contacts 214 and 216 become closed, resulting in the short-circuiting of the terminals 175 and 176 with respect to one another as well as the short-circuiting of the terminals 185 and 186 with respect to one another. The signals provided from the ports 37, 38 and 47, 48 are delayed relative to the signals provided from the ports 13, 14 and 23, 24 to prevent a race condition between contacts opening and closing. Consequently, notwithstanding the open-circuiting of the ports 37 and 38 with respect to one another and the ports 47 and 48 with respect to one another within the first safety relay circuit 200, the terminals 175 and 178 remain short-circuited with respect to one another as do the terminals 185 and 188.

Consequently, if the gate remains open, the contacts 220 and 222 remain open preventing the closure of ports S22 and S21 or between S11 and S12. As a result, the safety relay circuit 202 remains "OFF" and prevents ports 13 and 14 and ports 23 and 24 from closing, and consequently the isolation of the machine 108 continues. If the gate is closed, however, the contacts 220 and 222 are closed, causing ports S22 and S21 and S11 and S12 to be closed and closing ports 13 and 14 and ports 23 and 24, and consequently the machine 108 again is provided with power.

The embodiment of the verification module 110 shown in FIG. 3 is intended to be merely exemplary of a variety of different additional or intermediate modules that could be implemented in relation to a primary control module such as the primary control module 102 providing for isolation from one or more power sources. Likewise, the overall system 100 shown in FIG. 2 is intended to be merely exemplary of a variety of different systems that could employ one or more intermediate modules such as (or similar to) that shown in FIG. 3, or could perform functions that are the same as or similar to the functions performed by the system 100.

In the present embodiment, the verification module 110 includes a high degree of redundancy, such that the verification module is resistant to failure and configured to enter predictable states of operation upon the failure of any given component. In alternate embodiments, the verification module 110 could have higher degrees or lesser degrees of redundancy. While particular circuits and other components, such as the safety relays 200,202 and guard locking switch 120, are discussed above in connection with FIGS. 2 and 3, it should be understood that these circuits and other components are merely exemplary, and that the present invention is intended to encompass a variety of other embodiments of intermediate modules and other devices utilizing other circuits and other components.

Although in the present embodiment shown in FIGS. 2 and 3, the primary control module 102 operates in conjunction with only a single verification module 110, in alternate embodiments multiple verification modules could be used in conjunction with the primary control module. For example, one verification module could be used in relation to each RLS 112. Also for example, a parallel set of verification modules could be utilized in a situation where there were multiple controlled devices, with one verification module being used in conjunction with each respective controlled device. Further, in some alternate embodiments, a sequential chain of verification modules (or other combination of verification modules) could be employed between, for example, a controlled device and a primary control module.

Further, in certain embodiments, the verification module 110 could operate independently of any primary control module, that is, for example, operate solely based upon or in response to one or more triggering switches such as one or more of the RLSs 112 and/or in relation to one or more controlled devices 120. As noted above, the present invention is intended to be applicable to a variety of controlled devices in a variety of environments, which can relate to a variety of different types of machines or other equipment used in industrial as well as other types of environments including, for example, large facilities such as hospitals, airports and other transportation facilities.

In still additional alternate embodiments, the signals received and/or provided by one or more verification modules could differ from those described with reference to FIGS. 2 and 3. In some embodiments, for example, the verification modules could be coupled directly or indirectly (e.g., by way of components of safety isolation systems) to safety networks so as to receive signals provided from remote sources and/or to provide signals to remote destinations via such safety networks. Also for example, the input devices providing input signals could be the same devices (or be related to the devices) to which control signals are provided and/or from which feedback or monitoring signals are received. In this regard, further for example, in certain alternate embodiments, the RLSs 112 (or similar devices) can be implemented on the gate lock devices themselves.

In one such embodiment, the gate lock device is configured to provide input signals to the safety isolation system (e.g., to the primary control module) when initial attempts are made to open the gate lock (e.g., when an initial amount of effort is made to slide open the gate lock). However, the gate lock device cannot be fully opened so as to allow opening of the gate/door associated therewith until such time as the verification module provides an appropriate control signal to the gate lock device. More particularly, once the verification module receives an indication from the primary control module that the machine receiving power has now been isolated, the verification module then provides a signal to the gate lock device allowing the gate lock to be fully opened so as to allow complete opening of the gate/door associated therewith.

Depending upon the embodiment, the physical assembly and construction of the verification module(s) in relation to the primary control module can vary considerably. In at least some embodiments, the components associated with the primary control module are contained within a distinct housing that is separate from a housing containing the components of the verification module(s). In further embodiments, the components of the primary control module itself are contained within two or more distinct housings, for example, one housing for the electric power isolation system and another housing for the pneumatic power isolation system. Yet in other embodiments, the primary control module and verification module(s) are housed together.

It is specifically intended that the present invention not be limited to the embodiments and illustrations contained herein, but include modified forms of those embodiments including portions of the embodiments and combinations of elements of different embodiments as come within the scope of the following claims.

We claim:

1. A control system comprising:
    a power isolation module that receives an input signal and, in response to the input signal, is capable of causing at least one power source to be connected to a first device, wherein the power isolation module includes both a first control module and at least one contactor; and
    a second control module coupled to the first control module, the second control module not forming part of the power isolation module,
    wherein the second control module receives at least one of the input signal and a secondary signal based upon the input signal,
    wherein the second control module further outputs a control signal in response to the at least one input and secondary signal,
    wherein the control signal is configured to be received by a second device associated with the first device;
    wherein the second control module receives at least one feedback signal from the second device; and
    wherein the second control module provides an additional signal based at least indirectly upon the at least one feedback signal back to the first control module, the additional signal influencing operation of the first control module;
    wherein the additional signal is representative, on at least one occasion, of both a first status of a first component of the second device and a second status of a second component of the second device as indicated by the at least one feedback signal; and
    wherein the first component is a gate lock, the first status is a locked/unlocked status of the gate lock, the second component is a gate, and the second status is an open/closed status of the pate.

2. The control system of claim 1, wherein the second control module includes at least one redundant means for enhancing reliability of the second control module in outputting the control signal.

3. The control system of claim 1, wherein the power isolation module is further capable of disconnecting the first device from the power source and grounding the first device in response to an additional input signal.

4. The control system of claim 1, wherein the control system is an industrial control system, and the power isolation module is a safety isolation system.

5. The control system of claim 4, wherein the power isolation module includes both an electric power isolation system and a pneumatic or hydraulic power isolation system, and is configured to connect at least two of electrical, pneumatic and hydraulic power to the first device in response to the input signal.

6. The control system of claim 5, wherein the input signal is generated at least indirectly by a remote lockout switch (RLS).

7. The control system of claim 1, wherein the control signal is provided by the second control module to the second device and causes a further status of a gate lock solenoid of the second device to change so as to cause a locking of the gate lock of the second device, and wherein the second control module receives the at least one feedback signal from the second device indicating that the further status of the gate lock solenoid has changed.

8. The control system of claim 1, wherein the second control module includes at least one safety relay circuit.

9. The control system of claim 1, wherein the input signal is generated at least indirectly by at least a portion of the second device.

10. A control system comprising:
    a power isolation module that receives an input signal and, in response to the input signal, is capable of causing at least one power source to be connected to a first device, wherein the power isolation module includes both a first control module and at least one contactor; and
    a second control module coupled to the first control module, the second control module not forming part of the power isolation module, wherein the second control module receives at least one of the input signal and a secondary signal based upon the input signal, wherein the second control module further outputs a control signal in response to the at least one input and secondary signal, wherein the control signal is configured to be received by a second device associated with the first device;

wherein the second control module receives a first feedback signal and a second feedback signal from the second device;

wherein the second control module provides an additional signal based at least indirectly upon the feedback signals back to the first control module, the additional signal influencing operation of the first control module;

wherein the additional signal is representative, on at least one occasion, of both a first status of a first component of the second device and a second status of a second component of the second device, and wherein the second control module is configured to operate so that the additional signal is representative of both the first status and the second status particularly subsequent to a time at which a first change in the first feedback signal has occurred, so long as the time occurs within a time period following the outputting of the control signal.

11. The control system of claim 10, wherein the first feedback signal is representative of the first status of the first component of the second device, wherein the first component is a gate lock, wherein the first status is a locked/unlocked status of the gate lock, wherein the second feedback signal is representative of the second status of the second component of the second device, wherein the second component is a gate, and wherein the second status is an open/closed status of the gate.

12. The control system of claim 10, wherein the second control module includes at least one redundant means for enhancing reliability of the second control module in outputting the control signal.

13. The control system of claim 10, wherein the power isolation module is further capable of disconnecting the first device from the power source and grounding the first device in response to an additional input signal.

14. The control system of claim 10, wherein the control system is an industrial control system, and the power isolation module is a safety isolation system, and wherein the power isolation module includes both an electric power isolation system and a pneumatic or hydraulic power isolation system, and is configured to connect at least two of electrical, pneumatic and hydraulic power to the first device in response to the input signal.

15. The control system of claim 14, wherein the input signal is generated at least indirectly by either at least one of a remote lockout switch (RLS) and at least a portion of the second device.

16. The control system of claim 10, wherein the control signal is provided by the second control module to the second device and causes a further status of a gate lock solenoid of the second device to change so as to cause a locking of a gate lock of the second device.

17. The control system of claim 10, wherein the second control module includes at least one safety relay circuit.

18. A control system comprising:
a power isolation module that receives an input signal and, in response to the input signal, is capable of causing at least one power source to be connected to a first device, wherein the power isolation module includes both a first control module and at least one contactor; and a second control module coupled to the first control module, the second control module not forming part of the power isolation module, wherein the second control module receives at least one of the input signal and a secondary signal based upon the input signal, wherein the second control module further outputs a control signal in response to the at least one input and secondary signal, wherein the control signal is configured to be received by a second device associated with the first device;

wherein the second control module receives a first feedback signal and a second feedback signal from the second device, the first feedback signal is representative of a locked/unlocked status of a gate lock of the second device, and the second feedback signal is representative of an open/closed status of a gate of the second device;

wherein the second control module provides an additional signal based at least indirectly upon the feedback signals back to the first control module, the additional signal influencing operation of the first control module;

wherein the additional signal is representative, on at least one occasion, of both the locked/unlocked status of the gate lock and the open/closed status of the gate; and wherein the second control module is configured to operate so that the additional signal is representative of both the locked/unlocked status and the open/closed status particularly subsequent to a time at which a first change in the first feedback signal has occurred, so long as the time occurs within a time period following the outputting of the control signal.

19. The control system of claim 18, wherein the second control module includes at least one redundant means for enhancing reliability of the second control module in outputting the control signal.

20. The control system of claim 18, wherein the power isolation module is further capable of disconnecting the first device from the power source and grounding the first device in response to an additional input signal.

21. The control system of claim 18, wherein the control system is an industrial control system, and the power isolation module is a safety isolation system, and wherein the power isolation module includes both an electric power isolation system and a pneumatic or hydraulic power isolation system, and is configured to connect at least two of electrical, pneumatic and hydraulic power to the first device in response to the input signal.

22. The control system of claim 21, wherein the input signal is generated at least indirectly by either at least one of a remote lockout switch (RLS) and at least a portion of the second device.

23. The control system of claim 18, wherein the control signal is provided by the second control module to the second device and causes a further status of a gate lock solenoid of the second device to change so as to cause a locking of the gate lock of the second device.

* * * * *

UNITED STATES PATENT AND TRADEMARK OFFICE
CERTIFICATE OF CORRECTION

PATENT NO. : 7,610,107 B2  
APPLICATION NO. : 11/226154  
DATED : October 27, 2009  
INVENTOR(S) : Michael R. Scharnick and Stephen Z. Zbytowski It is certified that error appears in the above-identified patent and that said Letters Patent is hereby corrected as shown below:

In column 14, line 24, replace "pate" with -- gate --.

Signed and Sealed this

Twelfth Day of January, 2010

David J. Kappos
*Director of the United States Patent and Trademark Office*